April 2, 1968 W. HERSCH 3,375,716

FLUID QUANTITY MEASURING DEVICE

Filed Oct. 12, 1965

INVENTOR.
WALTER HERSCH
BY John A. Harvey
ATTORNEY

United States Patent Office 3,375,716
Patented Apr. 2, 1968

3,375,716
FLUID QUANTITY MEASURING DEVICE
Walter Hersch, Woodbury, N.Y., assignor, by mesne assignments, to Simmonds Precision Products, Inc., a corporation of New York
Filed Oct. 12, 1965, Ser. No. 495,044
7 Claims. (Cl. 73—304)

ABSTRACT OF THE DISCLOSURE

The fluid quantity measuring gauge includes a sensing capacitor having spaced electrically conductive electrodes insulated from one another and adapted to be mounted within a container to provide between the electrodes a value of capacitance varying with the dielectric constant and quantity of fluid in the container. This sensing capacitor is included in a time-constant circuit of a multivibrator oscillator to effect variation of the average value of an output voltage of the oscillator with variation of the capacitance of the sensing capacitor. An indicator means, including an indicator device providing an indication range extending between range indicia corresponding to the empty and full fluid quantity conditions of the container and operating in combination with means for correlating such indication range indicia to the average values of the oscillator output voltage corresponding to the empty and full fluid quantity conditions of the container, indicates the prevailing average value of the oscillator output voltage and thus provides indications of the prevailing quantity of fluid in the container.

---

This invention relates to a measuring circuit employing a capacitor as a sensor and control element and, more particularly, to a circuit providing a capacitance-type gauge for measuring the quantity of a fluid within a container. A gauge embodying the invention as suitable for measuring the quantity of a liquid in dependence upon the height of the liquid in a container, or may be used to measure the quantity of a gaseous fluid in a container under prevailing conditions such that the fluid has a significant measurable value of dielectric constant.

The use of a capacitor as a sensor element for measuring the quantity of a fluid in a container depends on the fact that the capacitance of the capacitor is a direct function of the dielectric constant of the material between the plates of the capacitor. A measuring capacitor includes two or more electrically conductive electrodes which are electrically insulated from one another and spaced apart to permit the fluid to flow freely therebetween. One typical form of such capacitor includes nested cylindrical conductive electrodes supported in spaced relation to one another by end insulator members and with suitable apertures at each end to permit the free flow of fluid into and out of the inter-electrode space. Another form of sensing capacitor having particular advantages is that disclosed in the United States Letters Patent No. 2,911,576 to deGiers.

A widespread application of such capacitors is in the capacitive form of liquid gauge wherein the capacitor is mounted within a container in a manner permitting the level of the liquid between the electrodes to rise or fall as the liquid level in the container varies. Thus when the container is empty, or when the level of the liquid is below the bottom edge of the electrodes of the measuring capacitor, the dielectric material between the electrodes is air which has a dielectric constant of unity. The liquid to be received within the container, however, has a dielectric constant greater than unity as in the case of aircraft fuels which have a dielectric constant within a range of approximately 1.8 to 2.2. As more liquid is received within the container, the liquid level within the container and between the electrodes is raised, displacing the air in the space between the electrodes and effecting a proportional increase in the capacitance of the capacitor. This change of capacitance is measured as an indication of the quantity of liquid within the container.

Measuring capacitors of the aforedescribed type are well known in the art and have been employed heretofore in various forms of alternating current circuits. The present invention provides a quantity measuring gauge circuit of the capacitive type employing such a measuring capacitor; the circuit is of simplified construction requiring only a relatively low unidirectional energizing voltage, includes a minimum number of inexpensive, readily assembled components, and is highly reliable and accurate in use.

The measuring circuit of the invention additionally provides for compensating adjustments to correlate the measurement indications of an indicator, such as an electric meter, with the actual quantity of the fluid material within the container. The adjustments, once made, remain accurate in subsequent emptying and filling of the container, and also within reasonable ranges of variation of a relatively low value unidirectional supply voltage to the circuit.

An important consideration in the measurement of the level of an inflammable fluid, such as an airplane fuel, is that the measuring circuit must not introduce high voltages into the vicinity of the fluid or otherwise cause a sufficiently large value of capacitor current flow as to create the possibility of initiating combustion of vapors from the fluid. To this end, in the measuring circuit of the invention, the measuring capacitor is isolated from the supply terminals by current and voltage limiting circuit components such that the potential developed between the capacitor electrodes is always substantially less than the supply potential. In addition, in a preferred embodiment of the invention, the active circuit components are preferably low-voltage transistors, enabling energization of the circuit by a correspondingly low voltage unidirectional power supply.

It is, therefore, an object of this invention to provide an improved capacitance-type gauge requiring only relatively low unidirectional voltage energization and one which is low in cost and provides highly accurate quantity measurements.

A further object of this invention is to provide a fluid quantity measuring circuit of the capacitive type including a measuring capacitor and a minimum number of inexpensive and stable components, and one which is readily adjustable to provide accurate measurement of the quantity of a fluid material in various sizes of containers.

Another object of this invention is to provide a capacitance-type gauge which is low in cost of manufacture and of operation and which is reliable in operation and safe to use for measuring the quantity of a volatile and inflammable liquid or gas.

These and other objects of this invention will become apparent as the following description proceeds. For a better understanding of the invention, reference may be had to the following detailed description and drawings in which.

Figure 1:
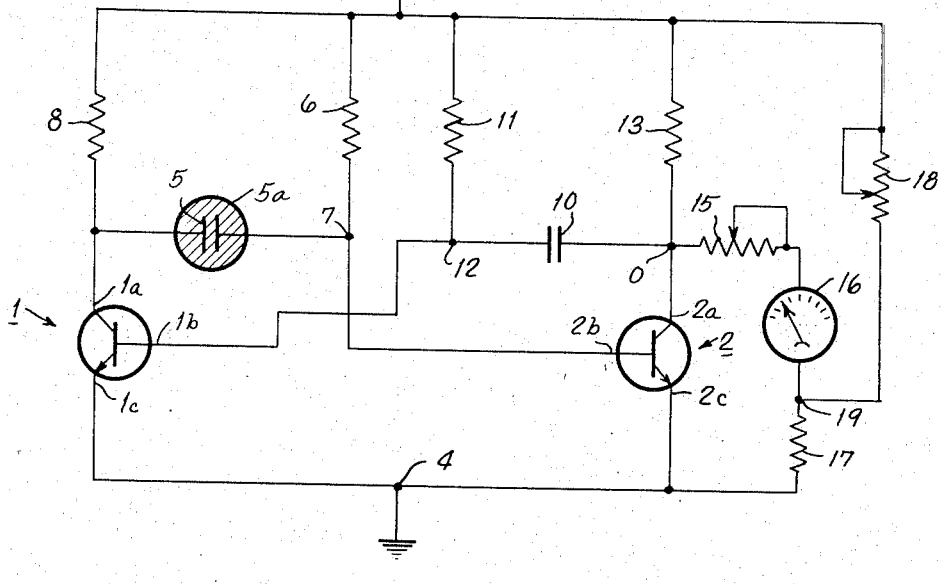
FIG. 1 is a schematic circuit diagram of one form of quantity measuring circuit embodying the invention.

The measuring circuit of the invention, as shown in FIG. 1, includes what may conveniently be considered a free-running multivibrator portion and an indicating portion. The multivibrator portion of the circuit includes a pair of transistors 1 and 2 including collector terminals 1a, 2a, base terminals 1b, 2b, and emitter terminals 1c, 2c, respectively. The transistors are shown by way of example as of the NPN type, in which the current between the collector and emitter terminals increases with an increase in the base-emitter positive voltage. By suitable reversal of polarity of the energizing voltage, as is well known in the art, the circuit may employ PNP transistors if desired.

The transistors 1 and 2 are connected between a positive power supply voltage terminal 3 and a negative power supply voltage terminal 4 in a grounded emitter configuration in which the emitter terminals 1c and 2c are connected to the negative terminal 4. The collector terminal 1a of the transistor 1 is connected to the positive terminal 3 by a time-constant network comprising a measuring capacitor 5, more fully considered hereinafter, and a bias resistor 6 connected in series by a common junction 7. The collector terminal 1a is also connected through a load resistor 8 to the positive terminal 3. In similar fashion, the collector terminal 2a of the transistor 2 is connected to the positive termial 3 by a time-constant network comprising a capacitor 10 and a bias resistor 11 connected in series by a common junction 12. The collector terminal 2a further is connected to the positive terminal 3 through a load resistor 13.

The junction 7 is conneceted to the base terminal 2b, and thus the input circuit, of the transistor 2, and the junction 12 is conneceted to the base terminal 1b, and thus the input circuit, of the transistor 1. The capacitor 5 couples the output circuit of the transistor 1, comprising its collector-emitter conduction path and the load resistor 8, to the junction 7 and thus to the input circuit of transistor 2. Similarly, the capacitor 10 couples the output circuit of the transistor 2, comprising its collector-emitter conduction path and the load resistor 13, to the junction 12, and thus to the input circuit of transistor 1. The input and output circuits of transistors 1 and 2 are therefore cross-coupled. The capacitor 5 is a measuring capacitor such as one of the types hereinbefore described, and is shown positioned in a container 5a cross-hatched to represent a contained fluid material the quantity of which is to be measured.

The portion of the circuit which has just beeen described comprises a multivibrator, and operates as a free-running square-wave oscillator. The oscillator has an output terminal O at the circuit junction connecting the collector terminal 2a with the capacitor 10 and the resistor 13. The waveforms of FIGS. 2 and 3 represent the voltage output with time taken at the terminal O during two different conditions of operation of the square-wave oscillator, corresponding to two different quantities of fluid material to be measured.

Figure 2:
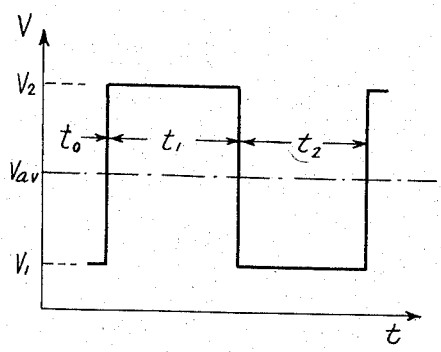
FIG. 2 is a graph showing a first waveform of an output voltage generated by the circuit of FIG. 1 under a first condition of operation of the circuit, for example corresponding to a first fluid level.

The waveform of FIG. 2 is applicable to an empty container 5a and indicates that the output of the square-wave oscillator is a square wave symmetrical about an average voltage $V_{av}$ and having a minimum voltage of $V_1$ and a maximum voltage of $V_2$. In the waveform of FIG. 2, the time interval $t_1$ represents the conductive interval of the transistor 1 and is equal to the time interval $t_2$ representing the conductive interval of the transistor 2.

Figure 3:
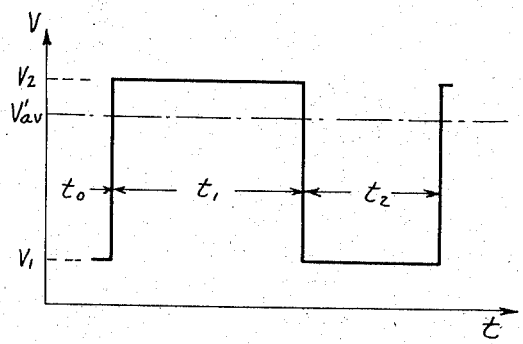
FIG. 3 is a graph showing a second waveform of the same output voltage as in FIG. 2 but under a second operating condition of the circuit corresponding to a second fluid level.

The waveform of FIG. 3 is applicable to the condition of a container 5a filled with a fluid the quantity of which is to be measured, the interval $t_1'$ again representing the conductive interval of the transistor 1 which now exceeds, or is of longer duration than, the interval $t_2$ representing the conductive interval of the transistor 2. When the interval $t_1$ equals the interval $t_2$, as in FIG. 2, the average voltage of one entire cycle, comprising the sum of the intervals $t_1$ and $t_2$, equals one-half of the sum of the voltage amplitudes $V_1$ and $V_2$, as shown by the broken line labeled $V_{av}$ intermediate amplitudes $V_1$ and $V_2$. However, when the interval $t_1'$ exceeds the interval $t_2$, as in FIG. 3, the average voltage amplitude of one entire cycle comprised again by the sum of the intervals $t_1'$ plus $t_2$ is greater than one-half of the sum of the voltage amplitudes $V_1$ and $V_2$, as indicated by the dotted line $V'_{av}$.

The operation of the multivibrator circuit in producing the waveform of FIGS. 2 and 3 will now be described. As noted previously, the multivibrator operates as a free-running square-wave oscillator. The transistors 1 and 2 preferably are driven to saturation in their respective conductive intervals. The voltage between the collector and emitter terminals of a saturated conducting transistor is very small and thus the resistance in the current path therebetween is likewise very small. Assuming the transistor 1 to be non-conducting and the transistor 2 to be conducting, the resistance between the collector and emitter terminals 2a and 2c of transistor 2 is low; conversely, the resistance between the collector and emitter terminals 1a and 1c of transistor 1 is high. Thus, a relatively large current flows from the positive terminal 3 through the load resistor 13 and the transistor 2 to the negative terminal 4, while no current flows through the transistor 1 and its associated circuit components. Due to the low resistance of transistor 2, a very small voltage drop is developed between the collector terminal 2a and the emitter terminal 2c and thus a relatively low voltage is developed at the output terminal O. This state of operation corresponds to the portion of the waveform of FIG. 2 during the terminal portion of the time period $t_0$ and provides the output voltage $V_1$.

The capacitor 10 was previously partially discharged during the interval $t_0$ by current flow through the resistor 13 and base-emitter resistance of the transistor 1 in the then conductive state of the latter, and now begins to charge once more to raise the potential at the junction point 12; upon a sufficiently high positive potential being established at this junction point, and thus at the base terminal 1b of the transistor 1, the transistor 1 is rapidly triggered into full conduction in a regenerative manner well known in the art. Conduction of the transistor 1 reduces the resistance between its collector and emitter terminals 1a and 1c, providing a low resistance connection between one terminal of the capacitor 5 and the negative terminal 4.

The capacitor 5 was previously partially discharged by current flow through the resistor 8 and the base-emitter resistance of the transistor 2 during the conductive state of the latter, and now begins to charge once again by current flow from the positive terminal 3 and through the resistor 6 and the transistor 1 to the negative terminal 4 to produce a voltage drop across the resistor 6 which initially is approximately equal to the supply voltage. The positive potential at the junction 7 and thus at the base terminal 2b of the transistor 2 therefore is lowered rapidly, effecting a regenerative rapid turn-off of the conduction of the transistor 2.

In its turned-off or non-conductive state, the transistor 2 exhibits a high collector-emitter electrode resistance, and almost the entire supply voltage appears across its collector and emitter terminals 2a and 2b. Thus, the voltage at the output terminal O is raised to approximately that of the positive terminal 3. This rapid increase in voltage at the output terminal O is shown as the substantially vertical line at the initiation of the time interval $t_1$ and which increases from the voltage $V_1$ to the higher voltage $V_2$ to delineate between the time periods $t_0$ and $t_1$ in the graph of FIG. 2. Since transistor 2 remains in this state during its entire interval of non-conduction, the voltage at the output terminal O is sustained at the level $V_2$ throughout the time period $t_1$.

During the entire time period $t_1$, the transistor 1 remains in its fully conductive state and the capacitor 5 charges in accordance with the time-charge characteristic of the series charging circuit comprised by the capacitor 5 and the resistor 6. The charging of capacitor 5 increases the voltage level at junction 7; when a sufficiently high positive voltage is developed at junction 7, and thus at the base terminal 2b of the transistor 2, the transistor 2 is triggered into full conduction in well known regenerative manner. When thus rendered conductive, the transistor 2 exhibits a very low collector-emitter resistance, and the output voltage at the output terminal O is likewise very low for reasons previously explained and is represented by the voltage level $V_1$ in the graph of FIG. 2. The substantially vertical line extending from the voltage $V_2$ to the lower voltage $V_1$ at the initiation of the time interval $t_2$ represents the rapid turn-off of conduction of the transistor 1 and the rapid turn-on of conduction of the transistor 2. Transistor 2 remains conducting throughout the time interval $t_2$; when capacitor 10 is again charged to a potential presenting a sufficiently high positive voltage at the junction 12 to trigger the transistor 1 into conduction, the previously described cycle thereupon repeats.

If the measuring capacitor 5 has a capacitance equal to that of the capacitor 10 when the fluid level is below the electrodes of the measuring capacitor 5 and the resistors 6 and 11 have equal values, then the charge time characteristics of the time-constant network comprised by the capacitor 5 and the resistor 6 and that of the network comprised by the capacitor 10 and resistor 11 are identical. As a result, the intervals of conduction of the transistors 1 and 2 are of the same duration, as represented by the equality of the time intervals $t_1$ and $t_2$ in the graph of FIG. 2.

Whereas the network of capacitor 10 and bias resistor 11 is formed of fixed-value components, and thus has a fixed charge-time characteristic, the capacitance of the measuring capacitor 5 is variable and thus the charge-time characteristic of the network comprising the capacitor 5 and the resistor 6 is variable. As the quantity of fluid within the container increases, the proportionate increase in the capacitance between the electrodes of capacitor 5 increases the charge-time characteristic of the variable time constant network comprised by the capacitor 5 and resistor 6. The increase in time now required to charge the capacitor 5 results in an increase in the length of time that transistor 1 is conducting before capacitor 5 receives a sufficiently large charge and the junction 7 attains a sufficiently high positive voltage to trigger transistor 2 into conduction.

The graph of FIG. 3 shows the output waveform at the junction O when the fluid has thus increased the capacitance of the capacitor 5 resulting in an increase in its charge time and thus of the conductive interval, $t_1'$, of transistor 1. The greater duration of the time period $t_1'$, due to the extended duration of conduction of transistor 1, increases the average voltage from the level $V_{av}$ in FIG. 2 to the level $V'_{av}$ in FIG. 3. The larger the quantity of the fluid in the container up to its full limit, therefore, the greater the capacitance of the measuring capacitor 5 and the greater the time period $t_1'$ relative to the time period $t_1$. The corresponding increase in the average voltage $V'_{av}$ relative to the average voltage $V_{av}$ therefore provides a measure of the increase in fluid quantity in the container.

To provide a visual indication in response to the electrical measurement of the fluid quantity, there is employed a measuring circuit portion comprising an adjustable resistor 15, a meter 16, and a resistor 17 connected between the output terminal O and the negative power supply terminal 4. The resistor 17 further is connected at 19 in series with an adjustable resistor 18 to provide a voltage divider network between the positive and negative power supply terminals 3 and 4.

The voltage divider network of resistors 17 and 18 operates in conjunction with the adjustable resistor 15 to provide calibration of the meter 16 for proper correlation of the scale indications thereof relative to the actual fluid quantity being sensed. The meter 16 is of the direct-current type having a fixed scale providing a range of indications having linear graduations between two end-of-range limits, and includes a pointer movable over the scale in response to the average voltage at the terminal O. To achieve proper indications, it is desirable that the range of average voltage values developed at the terminal O between the full and empty states of the fluid container produce a range of meter pointer deflections covering the full indicator scale and that the minimum average voltage at the terminal O corresponding to an empty container shall produce no meter pointer deflection.

When the container is empty, the square-wave output voltage at terminal O will be as shown in FIG. 2 with the time intervals $t_1$ and $t_2$ of equal duration and the output square wave having the average value $V_{av}$. In some instances, it may be desired to provide an empty indication when there is a preselected minimum quantity of fluid in the container and in this case the average voltage of the output terminal O will be somewhat greater than $V_{av}$. In the usual case, however, an empty condition of the container is selected to provide the voltage output at terminal O substantially that shown in FIG. 2 and it will be assumed in the following description of the indicator adjustments that this selection prevails. The voltage divider network of resistors 17 and 18 provides a bias voltage at the series junction point 19 which opposes or bucks the average voltage level of the square-wave output at terminal O. Variable resistor 18 is adjusted such that the voltage at the series junction point 19 is of the same magnitude as the average voltage of the output square-wave at terminal O in the preselected empty condition of the container. Since meter 16 responds only to the average voltage of the output wave, and since the average voltage $V_{av}$ of the square-wave output at the empty condition of the container is opposed by a bias voltage of the same polarity and equal magnitude at the junction 19, there is no voltage difference created between the terminal O and the junction point 19. Thus the meter 16 is not energized and its pointer in non-deflected position provides an indication that the container is empty of fluid.

The correlation of the full scale meter indication with a preselected maximum quantity of fluid within the container is accomplished by adjustment of the resistor 15. The effect of the resistor 15 is to control the value of current flowing through the meter 16 in response to the average voltage of the output wave from the terminal O, and accordingly the resistor 15 is so adjusted that the average value of output voltage at the terminal O corresponding to a full container produces an average current through the meter 16 such as to provide a full range indication deflection of its pointer.

Thus by the easily performed adjustments of resistors 15 and 18, the indications of the meter 16 may be readily correlated to a sensing capacitor of any given value of capacitance and to a fluid container of any given size. For any irregular shape of container, either the sensing capacitor construction may linearize in conventional manner its change of capacitance per unit change of fluid quantity or the scale of the meter 16 may be provided with a suitable non-linear calibration to take into account the irregular shape of the container.

In summary, a measuring circuit embodying the invention provides a capacitance-type gauge which is of relatively simple construction utilizing a relatively small number of inexpensive, easily assembled and highly stable circuit components. The gauge of the invention operates with relatively low unidirectional energization to provide consistently accurate measurements of the quantity of fluid within a container and is one readily adjustable at initial installation and thereafter for accurately correlating the indications of its meter with the quantity of fluid measured.

Numerous modifications and adaptations of the gauge

What is claimed is:

1. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator including said capacitor in a time-constant circuit thereof to vary the average value of an output voltage with variation of the capacitance of said capacitor, and means for indicating the prevailing average value of said output voltage to provide an indication of the quantity of fluid in said container, said indicating means including an indicator device providing an indication range extending between range indicia corresponding to the empty and full fluid quantity conditions of said container and means for correlating said indication range indicia of said indicator device to the average values of said output voltage corresponding to a value of dielectric constant of said fluid and to said empty and full fluid quantity conditions of said container.

2. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator for producing a cyclic output voltage having first and second intervals in each cycle and including first and second time-constant circuits controlling the duration of the first and second intervals, respectively, of the output voltage, said sensing capacitor being included in one of said time-constant circuits and varying the time-constant thereof with variation of its capacitance to vary the duration of the interval of the output voltage controlled thereby and the average value of the output voltage, and means for indicating the prevailing average value of said output voltage to provide an indication of the quantity of fluid in said container, said indicating means including a voltage-responsive indicator device providing an indication range extending between range indicia corresponding to the empty and full fluid quantity conditions of said container and adjustable means for adjusting upper and lower voltage responsive values of said indicator device to correlate said indication range indicia thereof to the average values of said output voltage corresponding to a value of dielectric constant of said fluid and to said empty and full fluid quantity conditions of said container.

3. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator for producing a cyclic output voltage having first and second intervals in each cycle and including first and second transistors and first and second time-constant circuits respectively associated therewith, said time-constant circuits controlling the duration of conduction of the respectively associated transistors and the duration of the first and second intervals, respectively, of each cycle of the output voltage generated thereby, said sensing capacitor being included in one of said time-constant circuits and varying the time-constant thereof with variation of its capacitance to vary the duration of the interval of the output voltage controlled thereby and the average value of the output voltage, voltage-responsive indicator means for indicating the prevailing average value of said output voltage and having an indication range extending between range indicia corresponding to the empty and full fluid quantity conditions of said container, and adjustable voltage-dropping means and adjustable potential divider means for respectively adjusting upper and lower voltage-responsive values of said indicator means to indicate upper and lower prevailing average values of said output voltage correlated to a value of dielectric constant of said fluid and to said indicator indicia range and thereby provide an indication of the quantity of fluid in said container between said empty and full fluid quantity conditions thereof.

4. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator for producing a cyclic output voltage having first and second intervals and including first and second transistors and first and second time-constant circuits respectively associated therewith, said first and second time-constant circuits controlling the duration of conduction of the respectively associated first and second transistors and the duration of the first and second intervals, respectively, of each cycle of the output voltage generated thereby, said sensing capacitor being included in one of said time-constant circuits for varying the time-constant thereof with variation of its capacitance to vary the duration of the interval of the output voltage controlled thereby and the average value of the output voltage, said one of said time-constant circuits including said sensing capacitor having substantially the same value of time constant as the other of said time-constant circuits in the absence of a fluid in said container affecting the value of the capacitance of said sensing capacitor, and means for indicating the prevailing average value of said output voltage to provide an indication of the quantity of fluid in said container, said indicating means including a voltage-responsive indicator device having an indication range extending between range indicia corresponding to the empty and full fluid quantity conditions of said container and manually adjustable means for adjusting upper and lower voltage-responsive values of said indicator device to correlate said indication range indicia thereof to the average values of said output voltage corresponding to the prevailing value of dielectric constant of said fluid and to said empty and full fluid quantity conditions of said container.

5. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator for producing a cyclic output voltage having first and second intervals in each cycle and including first and second transistors and first and second time-constant circuits respectively associated therewith, said first and second time-constant circuits controlling the duration of conduction of the respectively associated first and second transistors and the duration of the first and second intervals respectively, of each cycle of the output voltage generated thereby, one of said time-constant circuits including said sensing capacitor and a first resistor and the other of said time-constant circuits including a second capacitor and a second resistor, said sensing capacitor varying the time-constant of said one of said time-constant circuits with variation of its capacitance to vary the duration of the interval of the output voltage controlled thereby and the average value of the output voltage, and means for indicating the prevailing average value of said output voltage to provide an indication of the quantity of fluid in said container, said indicating means including an indicator device having an indication range extending between range indicia corresponding to the empty and full fluid quantity conditions of said container and means for correlating said indication range indicia of said indicator device to the average values of said output voltage corresponding to a value of dielectric constant of said fluid and to said empty and full fluid quantity conditions of said container.

6. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator adapted for energization at positive and negative power supply terminals for producing a cyclic output voltage having first and second intervals in each cycle and including first and second transistors and first and second time-constant circuits respectively associated therewith, said first and second time-constant circuits controlling the duration of conduction of the respectively associated first and second transistors and the duration of the first and second intervals, respectively, of the output voltage generated thereby, one of said time-constant circuits including said sensing capacitor and the other of said time-constant circuits including a fixed capacitor, said sensing capacitor varying the time constant of said one of said time-constant circuits with variation of its capacitance to vary the duration of the interval of the output voltage controlled thereby and the average value of the output voltage, each of said first and second transistors including collector, emitter, and base terminals, said emitter terminals being connected to one terminal of said power supply, said collector terminals being connected through the respectively associated first and second time-constant circuits to the other terminal of said power supply, and said base terminals each being connected to the collector terminal of the other of said transistors through the capacitor of the time-constant circuit associated with the other of said transistors, said multivibrator oscillator further including a first and second load resistor connecting the collector terminals of said first and second transistors, respectively, to said other terminal of said power supply, the connection of the collector terminal of one of said transistors and its associated load resistor providing an output terminal at which is produced the output voltage, indicating circuit means including a variable resistor and a meter connected in series between said output terminal and said one terminal of said power supply, said meter having indication means movable through a range of indications and said resistor being adjustable to correlate the range of average values of said output voltage applied to said meter with the range of indications of said indicator means of said meter, and said meter indicating the prevailing average value of said output voltage to provide an indication of the quantity of fluid in said container.

7. A gauge for measuring the quantity of a fluid in a container comprising a sensing capacitor having spaced electrically conductive electrodes insulated from one another and adapted to be mounted within said container to provide between said electrodes a value of capacitance varying with the dielectric constant and quantity of fluid in said container, a multivibrator oscillator adapted for energization at positive and negative power supply terminals for producing a cyclic output voltage having first and second intervals in each cycle and including first and second transistors and first and second time-constant circuits respectively associated therewith, said first and second time-constant circuits controlling the duration of a conduction of the respectively associated first and second transistors and the duration of the first and second intervals, respectively, of the output voltage generated thereby, one of said time-constant circuits including said sensing capacitor and the other of said time-constant circuits including a fixed capacitor, said sensing capacitor varying the time constant of said one of said time-constant circuits with variation of its capacitance to vary the duration of the interval of the output voltage controlled hereby and the average value of the output voltage, each of said first and second transistors including collector, emitter, and base terminals, said emitter terminals being connected to one terminal of said power supply, said collector terminals being connected through the respectively associated first and second time-constant circuits to the other terminal of said power supply, and said base terminals each being connected to the collector terminal of the other of said transistors through the capacitor of the time-constant circuit associated with the other of said transistors, said multivibrator oscillator further including a first and second load resistor connecting the collector terminals of said first and second transistors, respectively, to said other terminal of said power supply, the connection of the collector terminal of one of said transistors and its associated load resistor providing an output terminal at which is produced the output voltage, a voltage divider circuit including a first variable resistor and a third resistor connected in series at a common junction between the positive and negative power supply terminals, an indicating circuit including a second variable resistor and an electric meter connected in series between said output terminal and said common junction of said voltage divider circuit, said meter having indicating means movable through a range of indications, said first variable resistor being adjustable to correlate an average voltage of the output wave with an empty indication of said indicator means of said meter and said second variable resistor being adjustable to correlate the range of average voltages of the output voltage applied to said meter with the range of indications of said indicator means of said meter, and said meter indicating the prevailing average value of said output voltage to provide an indication of the quantity of fluid in said container.

References Cited

UNITED STATES PATENTS

| | | | |
|---|---|---|---|
| 2,621,517 | 12/1952 | Sontheimer | 73—304 |
| 2,677,964 | 5/1954 | Engelder | 73—304 |
| 2,780,795 | 2/1957 | Ambrosio | 331—65 |
| 3,253,153 | 5/1966 | Stoddard | 331—113 |

FOREIGN PATENTS 460,297    1/1937    Great Britain.

JOHN KOMINSKI, *Primary Examiner.*